United States Patent
Eda et al.

(10) Patent No.: US 10,293,300 B2
(45) Date of Patent: May 21, 2019

(54) NATURAL-GAS PURIFICATION APPARATUS

(71) Applicant: MITSUBISHI HEAVY INDUSTRIES, LTD., Tokyo (JP)

(72) Inventors: Masayuki Eda, Houston, TX (US); Wataru Matsubara, Tokyo (JP); Shintaro Honjo, Tokyo (JP); Susumu Okino, Tokyo (JP); Hiromi Nakatani, Tokyo (JP); Masaki Yushima, Hiroshima (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 124 days.

(21) Appl. No.: 15/475,937

(22) Filed: Mar. 31, 2017

(65) Prior Publication Data

US 2018/0283778 A1  Oct. 4, 2018

(51) Int. Cl.
  *F25J 3/06* (2006.01)
  *B01D 53/22* (2006.01)
  *C10L 3/10* (2006.01)

(52) U.S. Cl.
  CPC .............. *B01D 53/22* (2013.01); *C10L 3/101* (2013.01); *C10L 3/104* (2013.01); *F25J 3/067* (2013.01); *C10L 2290/548* (2013.01); *C10L 2290/567* (2013.01); *C10L 2290/58* (2013.01); *C10L 2290/60* (2013.01); *F25J 2210/80* (2013.01); *F25J 2215/80* (2013.01); *Y02C 10/12* (2013.01)

(58) Field of Classification Search
  CPC .... F25J 3/067; F25J 3/0615; F25J 3/08; F25J 3/0267; F25J 2210/80; F25J 2215/80; B01D 53/1475; B01D 53/1462; B01D 2256/22; B01D 2257/504; C01B 32/00
  See application file for complete search history.

(56) References Cited

U.S. PATENT DOCUMENTS 3,250,080 A * 5/1966 Garwin ................ B01D 53/226
                                                62/624
2011/0247360 A1* 10/2011 Hasse .................. B01D 53/228
                                                62/606

(Continued)

FOREIGN PATENT DOCUMENTS

JP  2009-113994 A  5/2009
JP  2016-155987 A  9/2016

*Primary Examiner* — Brian M King
(74) *Attorney, Agent, or Firm* — Westerman, Hattori, Daniels & Adrian, LLP

(57) ABSTRACT

A natural-gas purification apparatus includes: a plurality of carbon-dioxide separation units that are arranged in series and separate carbon dioxide, through carbon-dioxide separation membranes, from natural gas pressurized by a compressor, cooled by a cooling unit to liquefy and separate a high-boiling-point hydrocarbon component, and heated by a heating unit; a gas supply pipe that is provided between the plurality of carbon-dioxide separation units through on-off valves and that supplies the natural gas; a compressor that is provided to the gas supply pipe; a cooling unit that liquefies and separates a high-boiling-point hydrocarbon component by cooling the natural gas pressurized by this compressor; and a heating unit that heats the natural gas after the separation of the high-boiling-point hydrocarbon component by this cooling unit.

4 Claims, 4 Drawing Sheets

(56) References Cited

U.S. PATENT DOCUMENTS

2013/0098105 A1* 4/2013 Northrop ................ C10L 3/102
62/617
2015/0300734 A1* 10/2015 Davidian ............. B01D 53/002
62/624

* cited by examiner

NATURAL-GAS PURIFICATION APPARATUS

TECHNICAL FIELD

The present invention relates to a natural-gas purification apparatus for purifying natural gas from the ground by separating carbon dioxide from the natural gas.

BACKGROUND ART

Natural gases discharged to the surface of the ground from high-temperature high-pressure underground areas such as oil and gas fields include: dry gases with one to two carbon atoms such as methane ($CH_4$) and ethane ($C_2H_6$), which are in gaseous form even at normal temperature and pressure; natural-gas liquids (NGL) containing components with three to four carbon atoms such as propane ($C_3H_3$) and butane ($C_4H_{10}$), which are in gaseous form at normal temperature and pressure but are easily liquefied when pressurized or cooled, and components with five or more carbon atoms such as pentane ($C_5H_{12}$), which is in liquid form at normal temperature and pressure; and non-hydrocarbon gases such as carbon dioxide ($CO_2$).

As described in, for example, Patent Literature 2, such a natural gas is pressurized (to 0.5 to 2 MPa) by a compressor and cooled (to 0 to 20° C.) by a cooling unit to undergo gas-liquid separation in which a part of its natural-gas liquid that is a high-boiling-point hydrocarbon component is liquefied. The natural gas is then raised in temperature by being heated (to 50 to 80° C.) by a heating unit. Thereafter, the carbon dioxide is passed through a carbon-dioxide separation membrane to a lower pressure side, so that the carbon dioxide is separated and removed from the natural gas. As a result, the natural gas is purified.

The composition of natural gas (the proportions of dry gas, natural-gas liquid, carbon dioxide, and the like) differs from one natural-gas source to another. Thus, a natural-gas purification apparatus as mentioned above has its equipment configured according to the composition of the natural gas to balance the apparatus' performance and natural-gas purification cost (including costs such as the raw-material cost, the equipment cost, and the running cost).

CITATION LIST

Patent Literatures (Patent Literature 1) Japanese Patent Application Publication No. 2009-113994

(Patent Literature 2) Japanese Patent Application Publication No. 2016-155987

SUMMARY OF INVENTION

Technical Problem

Meanwhile, an attempt to reduce natural-gas purification cost has been considered in which a natural-gas purification apparatus with equipment configured according to the composition of a natural gas is utilized for purification of a natural gas from another natural-gas source that, differs in composition from the former natural gas.

In the above-mentioned natural-gas purification apparatus, in the separation and removal of carbon dioxide from natural gas, the carbon dioxide expands and therefore drops in temperature when passed through the carbon-dioxide separation membrane to the lower pressure side. Consequently, the carbon dioxide cools the carbon-dioxide separation membrane. Since the carbon dioxide thus cools the carbon-dioxide separation membrane and lovers its temperature, then if the content of carbon dioxide is large, the temperature of the carbon-dioxide separation membrane will fall below the dew point of the natural gas (high-boiling-point hydrocarbon component) and the high-boiling-point hydrocarbon component (a part of the natural-gas liquid) will be liquefied on the higher pressure side and cover the carbon-dioxide separation membrane. This might cause functional deterioration of the carbon-dioxide separation membrane.

There are cases where carbon dioxide is pumped into an oil and gas field in an attempt to increase the amount of production of oil. In such a case, the pumping of carbon dioxide increases the content of carbon dioxide in the associated natural gas produced along with the oil. Then, as in the separation and removal of carbon dioxide mentioned above, the carbon-dioxide separation membrane is cooled and its temperature is lowered; the temperature of the carbon-dioxide separation membrane falls below the dew point of the natural gas (high-boiling-point hydrocarbon component) and the high-boiling-point hydrocarbon component is liquefied on the higher pressure side and covers the carbon-dioxide separation membrane. This might cause functional deterioration of the carbon-dioxide separation membrane.

For these reasons, the above-mentioned natural-gas purification apparatus has a problem that its equipment must be modified according to the content of carbon dioxide in natural gas, which increases the natural-gas purification cost accordingly.

In view of the above, the present invention has been made to solve the above-mentioned problem, and an object thereof is to provide a natural-gas purification apparatus capable of efficiently separating and removing carbon dioxide from natural gas irrespective of the content of carbon dioxide in the natural gas.

Solution to Problem

A natural-gas purification apparatus according to a first aspect for solving the problem described above is a natural-gas purification apparatus for purifying natural gas from ground by separating carbon dioxide from the natural gas, including: a first pressure adjuster that adjusts a pressure of the natural gas from the ground; a first high-boiling-point-hydrocarbon-component separator that liquefies and separates a high-boiling-point hydrocarbon component by cooling the natural gas after the pressure adjustment by the first pressure adjuster; a first heater that heats the natural gas after the separation of the high-boiling-point hydrocarbon component by the first high-boiling-point-hydrocarbon-component separator; a plurality of carbon-dioxide separators that are arranged in series and separate carbon dioxide from the natural gas heated by the first heater through carbon-dioxide separation membranes; a bypass path that is provided between the plurality of carbon-dioxide separators through a gas-flow switcher and supplies the natural gas; a second pressure adjuster that is provided on the bypass path and adjusts the pressure of the natural gas after the carbon-dioxide separation by the carbon-dioxide separators; a second high-boiling-point-hydrocarbon-component separator that liquefies and separates a high-boiling-point hydrocarbon component by cooling the natural gas after the pressure adjustment by the second pressure adjuster; and a second heater that heats the natural gas after the separation of the high-boiling-point hydrocarbon component by the second high-boiling-point-hydrocarbon-component separator.

A natural-gas purification apparatus according to a second aspect for solving the problem described above is the natural-gas purification apparatus according to the first aspect in which the carbon-dioxide separators include a first carbon-dioxide separation unit and a second carbon-dioxide separation unit to which the natural gas after the carbon-dioxide separation by the first carbon-dioxide separation unit is supplied, and the by-pass path includes a first gas supply path that supplies the natural gas after the carbon-dioxide separation by the first carton-dioxide separation unit to the second pressure adjuster, and a second gas supply path that supplies the natural gas heated by the second heater to the second carbon-dioxide separation unit.

A natural-gas purification apparatus according to a third aspect for solving the problem described above is the natural-gas purification apparatus according to the first aspect in which the carbon-dioxide separators include a first carbon-dioxide separation unit, a second carbon-dioxide separation unit to which the natural gas after the carbon-dioxide separation by the first carbon-dioxide separation unit is supplied, and a third carbon-dioxide separation unit to which the natural gas after the carbon-dioxide separation by the second carbon-dioxide separation unit is supplied, and the by-pass path includes a first gas supply path that supplies the natural gas after the carbon-dioxide separation by any one of the first and second carbon-dioxide separation units to the second pressure adjuster, and a second gas supply path that supplies the natural gas heated by the second heater to any one of the second and third carbon-dioxide separation units.

A natural-gas purification apparatus according to a fourth aspect for solving the problem described above is the natural-gas purification apparatus according to the first aspect in which the natural-gas purification apparatus is mobile.

Advantageous Effect of Invention

According to the present invention, in the purification of natural gas, a high-boiling-point hydrocarbon component can be removed as much as possible from the natural gas before the dew point of the high-boiling-point hydrocarbon component is reached, by simply switching the supply path of the natural gas according to the concentration of carbon dioxide in the natural gas from the ground to cause the natural gas to flow through the second pressure adjuster, the second high-boiling-point-hydrocarbon-component separator, and the second heater so that liquefaction of the high-boiling-point hydrocarbon component in the carbon-dioxide separators will be suppressed. Consequently, the temperatures of the carbon-dioxide separation membranes of the carbon-dioxide separators can be above the dew point of the high-boiling-point hydrocarbon component, thereby preventing liquefaction of the high-boiling-point hydrocarbon component, even when the carbon dioxide in the natural gas abruptly expands and drops in temperature by passing through the carbon-dioxide separation membranes. Hence, the natural gas can be efficiently purified. In the case of purifying a natural gas containing a high concentration of carbon dioxide, the natural-gas purification apparatus does not require modifications such as adding a device for preventing liquefaction of the high-boiling-point hydrocarbon component, but simply switches the gas flow according to the composition of the natural gas. Hence, versatility is improved.

DESCRIPTION OF EMBODIMENTS

An embodiment of a natural-gas purification apparatus according to the present invention will be described with reference to the drawings. It is to be noted that the present invention is not limited only to the following embodiment to be described with reference to the drawings.

A natural-gas purification apparatus according to an embodiment of the present invention will be described with reference to FIG. 1 to FIG. 4.

In this embodiment, description will be given of a case of purifying natural gas (raw-material gas) containing a high-boiling-point hydrocarbon component and carbon dioxide by separating the high-boiling-point hydrocarbon component and the carbon dioxide from the natural gas.

Figure 1:
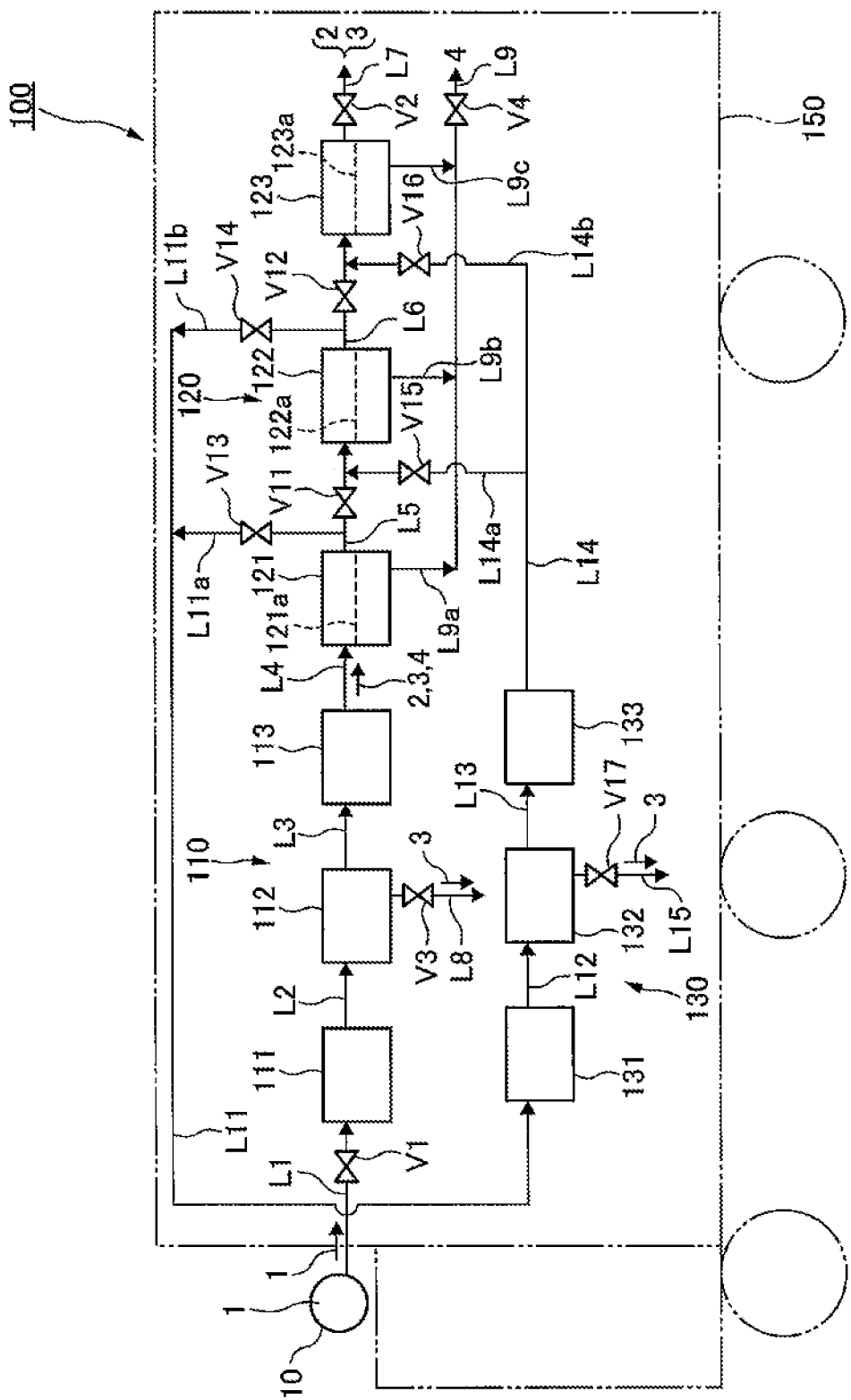
FIG. 1 illustrates a schematic configuration diagram of a natural-gas purification apparatus according to an embodiment of the present invention.

As illustrated in FIG. 1, a natural-gas purification apparatus 100 according to this embodiment includes a first carbon-dioxide-separation acceleration device (first carbon-dioxide-separation accelerator) 110 and a carbon-dioxide separation device 120 which are installed on a transport vehicle (trailer) 150. The carbon-dioxide separation device 120 is connected in series to the first carbon-dioxide-separation acceleration device 110.

The first carbon-dioxide-separation acceleration device 110 includes a first compressor (first pressure adjuster) 111, a first cooling unit (first high-boiling-point-hydrocarbon-component separator) 112, and a first heating unit (first heater) 113. An inlet port of the first compressor 111 is connectable to a natural-gas source 10 that discharges natural gas 1 from, for example, the ground by a gas supply pipe L1 provided with an on-off valve V1. An outlet port of the first compressor 111 is connected to an inlet port of the first cooling unit 112 by a gas supply pipe L2. A liquid outlet port of the first cooling unit 112 communicates with the outside of the system through a liquid discharge pipe L3 provided with an on-off valve V3. A gas outlet port of the first cooling unit 112 is connected to an inlet port of the first heating unit 113 by a gas supply pipe L3. An outlet port of the first heating unit 113 is connected to a gas inlet port of a first carbon-dioxide separation unit 121 in the carbon-dioxide separation device 120, which will be described below in detail, by a gas supply pipe L4.

The carbon-dioxide separation device 120 includes the first carbon-dioxide separation unit 121, a second carbon-dioxide separation unit 122, and a third carbon-dioxide separation unit 123. The first carbon-dioxide separation unit 121 includes a carbon-dioxide separation membrane 121$a$ that separates carbon dioxide ($CO_2$) from gas. A post-separation-gas outlet port of the first carbon-dioxide separation unit 121 is connected to a gas inlet port of the second carbon-dioxide separation unit 122, which includes a carbon-dioxide separation membrane 122$a$, by a gas supply pipe L5. A post-separation-gas outlet port of the second carbon-dioxide separation unit 122 is connected to a gas inlet port of the third carbon-dioxide separation unit 123, which includes a carbon-dioxide separation membrane 123$a$, by a gas supply pipe L6. A post-separation-gas outlet port of the third carbon-dioxide separation unit 123 is connected to the outside of the system by a gas supply pipe L7 provided with an on-off valve V2. A carbon-dioxide outlet port of the first carbon-dioxide separation unit 121 is connected to a first branched portion L9$a$ of a carbon-dioxide discharge pipe L9. A carbon-dioxide outlet port of the second carbon-dioxide separation unit 122 is connected to a second branched portion L9$b$ of the carbon-dioxide discharge pipe L9. A carbon-dioxide outlet port of the third carbon-dioxide separation unit 123 is connected to a third branched portion L9$c$ of the carbon-dioxide discharge pipe L9. The distal end sides of the first branched portion L9$a$, the second branched portion L9$b$, and the third branched portion L9$c$ are gathered and connected into a single carbon-dioxide discharge pipe L9. The distal end side of the carbon-dioxide discharge pipe L9 is connected to the outside of the system. The carbon-dioxide discharge pipe L9 is provided with an on-off valve V4. Note that the first carbon-dioxide separation unit 121, the second carbon-dioxide separation unit 122, and the third carbon-dioxide separation unit 123 are designed to be capable of sufficiently separating and removing carbon dioxide 4 from the natural gas 1 even when the concentration of the carbon-dioxide gas in the natural gas 1 is 50% or higher by supplying the natural gas after the carbon-dioxide separation by the first carbon-dioxide separation unit 121 to the second and third carbon-dioxide separation units 122 and 123 through a second carbon-dioxide-separation acceleration device 130, which will be described later in detail.

For the carbon-dioxide separation membranes 121$a$ to 123$a$, it is preferable to use membranes of cellulose acetate, polyimide, fluororesins, or the like with a withstand temperature of 50 C or lower, and more preferable to use membranes with a withstand temperature of 80 C or lower.

The above natural-gas purification apparatus 100 further includes: gas supply pipes L11 to L14 serving as a bypass path which is provided between the first, second, and third carbon-dioxide separation units 121, 122, and 123 through on-off valves V11 to V16 serving as a gas-flow switcher and through which the natural gas 1 (dry gas 2, natural-gas liquid 3, carbon dioxide 41 may be caused to flow; and the second carbon-dioxide-separation acceleration device (second carbon-dioxide-separation accelerator) 130, which is provided separately of the first carbon-dioxide-separation acceleration device 110 at a given point on the gas supply pipes L11 to L14.

The distal end side of the gas supply pipe L11 is branched into a first branched portion L11$a$ and a second branched portion L11$b$. The distal end side of the first branched portion L11$a$ of the gas supply pipe L11 is connected to the gas supply pipe L5. The distal end side of the second branched portion L11$b$ of the gas supply pipe L11 is connected to the gas supply pipe L6. The proximal end side of the gas supply pipe L11 is connected to an inlet port of a second compressor 131 of the second carbon-dioxide-separation acceleration device 130, which will be described below in detail.

The second carbon-dioxide-separation acceleration device 130 includes the second compressor (second pressure adjuster) 131, a second cooling unit (second high-boiling-point-hydrocarbon-component separator) 132, and a second heating unit (second heater) 133.

An outlet port of the second compressor 131 is connected to an inlet port of the second cooling unit 132 by a gas supply pipe L12. A liquid outlet port of the second cooling unit 132 communicates with the outside of the system by a liquid discharge pipe L15 provided with an on-off valve V17. A gas outlet port of the second cooling unit 132 is connected to an inlet port of the second heating unit 133 by a gas supply pipe L13. An outlet port of the second heating unit 133 is connected to the gas inlet port of the second carbon-dioxide separation unit 122 by a first branched portion L14$a$ of the gas supply pipe L14 and the gas supply pipe L5 and connected to the gas inlet port of the third carbon-dioxide separation unit 123 by a second branched portion L14$b$ of the gas supply pipe L14 and the gas supply pipe L6.

The gas supply pipes L5 and L6 are provided with the on-off valves V11 and V12, respectively. The first and second branched portions L11$a$ and L11$b$ of the gas supply pipe L11 are provided with the on-off valves V13 and V14, respectively. The first and second branched portions L14$a$ and L14$b$ of the gas supply pipe L14 are provided with the on-off valves V15 and V16, respectively.

In the above natural-gas purification apparatus 100, components such as the first to third carbon-dioxide separation units 121 to 123 constitute carbon-dioxide separators. Components such as the gas supply pipes L5, L6, and L11 to L14 constitute a bypass path. Components such as the gas supply pipe L11 constitute a first gas supply path. Components such as the gas supply pipe L14 constitute a second gas supply path, components such as the on-off valves V11 to V16 constitute a gas-flow switcher.

Next, a natural-gas purification method using the above natural-gas purification apparatus 100 according to this embodiment will be described.

First, the composition of the natural gas 1 from the natural-gas source 10 (the proportions of the dry gas 2, the natural-gas liquid 3, the carbon dioxide 4, and the like) is figured out in advance using analysis equipment such as a gas chromatograph (GC).

The actuation of the first compressor 111, the first cooling unit 112, the first heating unit 113, the second compressor 131, the second cooling unit 132, and the second heating unit 133 and the opening degrees of the on-off valves V1 to V4 and V11 to V17 are adjusted and controlled according to this composition of the natural gas 1. Meanwhile, the opening degrees of the on-off valves V1 to V4 and V11 to V17 may be adjusted and controlled automatically by an arithmetic control device (not illustrated) or manually by an operator.

Figure 2:
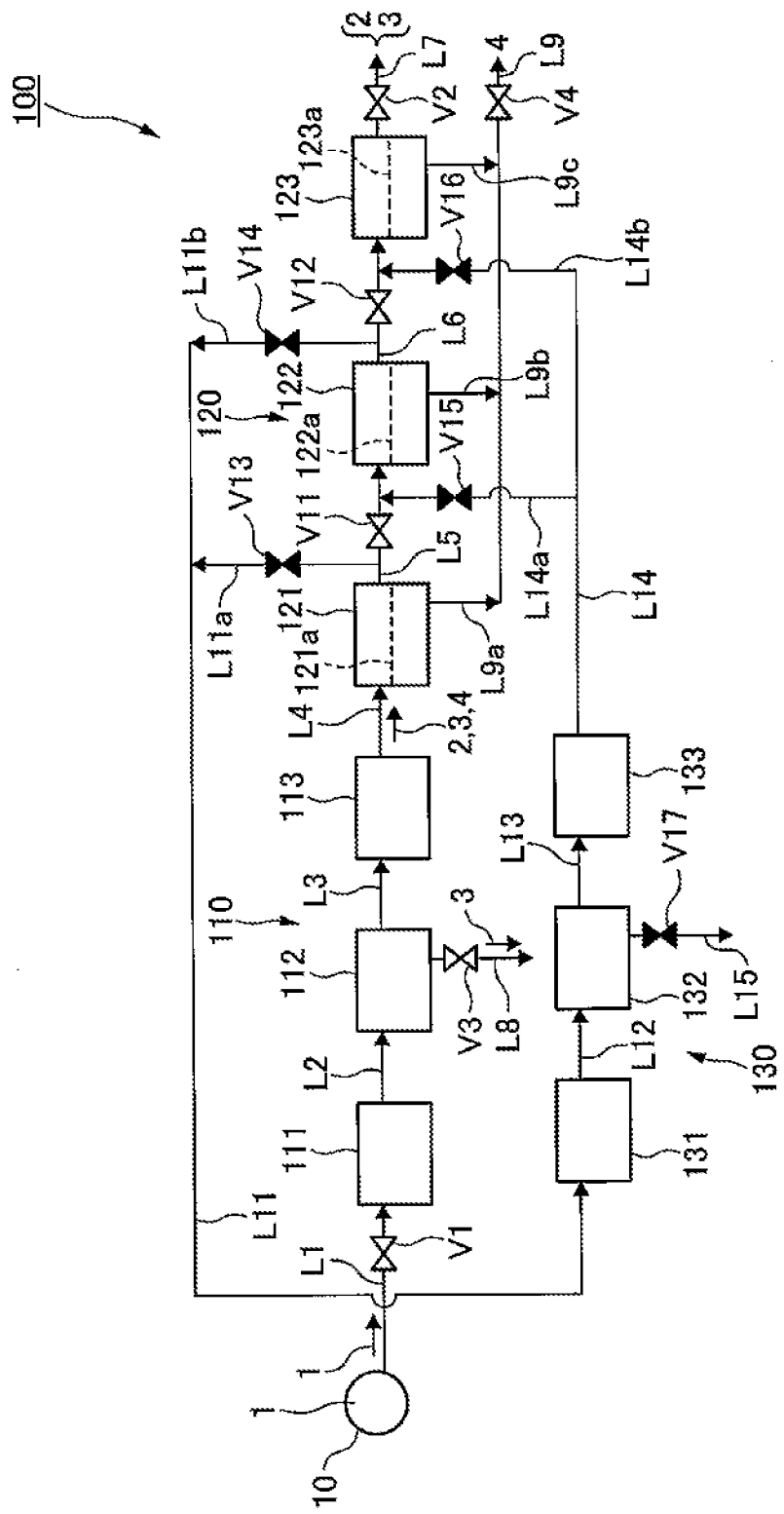
FIG. 2 illustrates a diagram for explaining gas flow in the natural-gas purification apparatus in purification of a natural gas with the concentration of carbon-dioxide gas in the natural gas being lower than or equal to a first predetermined value.

If the concentration of the carbon-dioxide gas in the natural gas 1 is lower than or equal to a first predetermined value (e.g. 20%), the on-off valves V13 to V17 are adjusted and controlled to close and the on-off valves V1, V3, V11, V12, V4, and V2 are adjusted and controlled to open, as illustrated in FIG. 2.

Thus, the natural gas 1 supplied from the natural-gas source 10 is pressurized (to 0.5 to 2 MPa) by the first compressor 111 and cooled (to 0 to 20 C) by the first cooling unit 112, so that a part of the natural-gas liquid 3 which is a high-boiling-point hydrocarbon component is liquefied and discharged to the outside of the system through the liquid discharge pipe L8 and the on-off valve V3. On the other hand, the remaining gas (the dry gas 2, the remaining part of the natural-gas liquid 3, and the carbon dioxide 4) is heated (to 50 to 80° C.) by the first heating unit 113 and then supplied to the first carbon-dioxide separation unit 121.

When the natural gas 1 is supplied to the first carbon-dioxide separation unit 121, the carbon dioxide 4 in the natural gas 1 is moved through the carbon-dioxide separation membrane 121a to the lower pressure side (the carbon-dioxide flow side) and discharged to the outside of the system through the first branched portion L9a of the carbon-dioxide discharge pipe L9 and the on-off valve V4. On the other hand, the remaining gas (the dry gas 2, the remaining part of the natural-gas liquid 3, and the remaining part of the carbon dioxide 4) is supplied to the second carbon-dioxide separation unit 122 through the gas supply pipe L5 and the on-off valve V11 without being liquefied.

When the natural gas 1 is supplied to the second carbon-dioxide separation unit 122, the carbon dioxide 4 in the natural gas 1 is moved through the carbon-dioxide separation membrane 122a to the lower pressure side (the carbon-dioxide flow side) and discharged to the outside of the system through the second branched portion L9b of the carbon-dioxide discharge pipe L9 and the on-off valve V4. On the other hand, the remaining gas (the dry gas 2, the remaining part of the natural-gas liquid 3, and the remaining part of the carbon dioxide 4) is supplied to the third carbon-dioxide separation unit 123 through the gas supply pipe L6 and the on-off valve V12 without being liquefied.

When the natural gas 1 is supplied to the third carbon-dioxide separation unit 123, the carbon dioxide 4 in the natural gas 1 is moved through the carbon-dioxide separation membrane 123a to the lower pressure side (the carbon-dioxide flow side) and discharged to the outside of the system through the third branched portion L9c of the carbon-dioxide discharge pipe L9 and the on-off valve V4. On the other hand, the remaining gas (the dry gas 2 and the remaining part of the natural-gas liquid 3) is collected through the gas supply pipe L7 and the on-off valve V2 without being liquefied.

In sum, the natural gas 1 is supplied to the first compressor 111, the first cooling unit 112, and the first heating unit 113 and then supplied to the first to third carbon-dioxide separation units 121 to 123 without being supplied to the second compressor 131, the second cooling unit 132, or the second heating unit 133. As the carbon dioxide 4 in the natural gas 1 is continually separated and removed by the carbon-dioxide separation membranes 121a to 123a of the first to third carbon-dioxide separation units 121 to 123, these carbon-dioxide separation membranes 121a to 123a are cooled, so that their temperatures drop. However, since the concentration of the carbon-dioxide gas in the natural gas 1 is lower than or equal to the first predetermined value (e.g. 20%), the temperature drop resulting from the carbon-dioxide separation and removal is small. Accordingly, the carbon-dioxide separation membranes 121a to 123a are maintained at higher temperature than the dew point of the natural gas (high-boiling-point hydrocarbon component).

Since liquefaction of the high-boiling-point hydrocarbon component is prevented as above, the natural gas 1 can be efficiently purified.

Now, assume that the on-off valves V13 to V17 are adjusted and controlled to close and the on-off valves V1, V3, V11, V12, V4, and V2 are adjusted and controlled to open, as illustrated in FIG. 2, when the concentration of the carbon-dioxide gas in the natural gas 1 is in a range greater than the first predetermined value but less than a second predetermined value greater than the first predetermined value (e.g. greater than 20% but less than 50%). In this case, the natural gas 1 is supplied to the first compressor 111, the first cooling unit 112, and the first heating unit 113 and then supplied to the first to third carbon-dioxide separation units 121 to 123 without being supplied to the second compressor 131, the second cooling unit 132, or the second heating unit 133. Thus, the carbon dioxide 4 in the natural gas 1 is separated and removed by the carbon-dioxide separation membranes 121a to 123a of the first to third carbon-dioxide separation units 121 to 123. In this operation, however, the carbon-dioxide separation membranes 121a to 123a are cooled and their temperatures possibly drop to such an extent that the high-boiling-point hydrocarbon component is liquefied on the higher pressure side of the carbon-dioxide separation membrane 123a of the third carbon-dioxide separation unit 123 and covers the carbon-dioxide separation membrane 123a, thereby causing functional deterioration of the carbon-dioxide separation membrane 123a.

Figure 3:
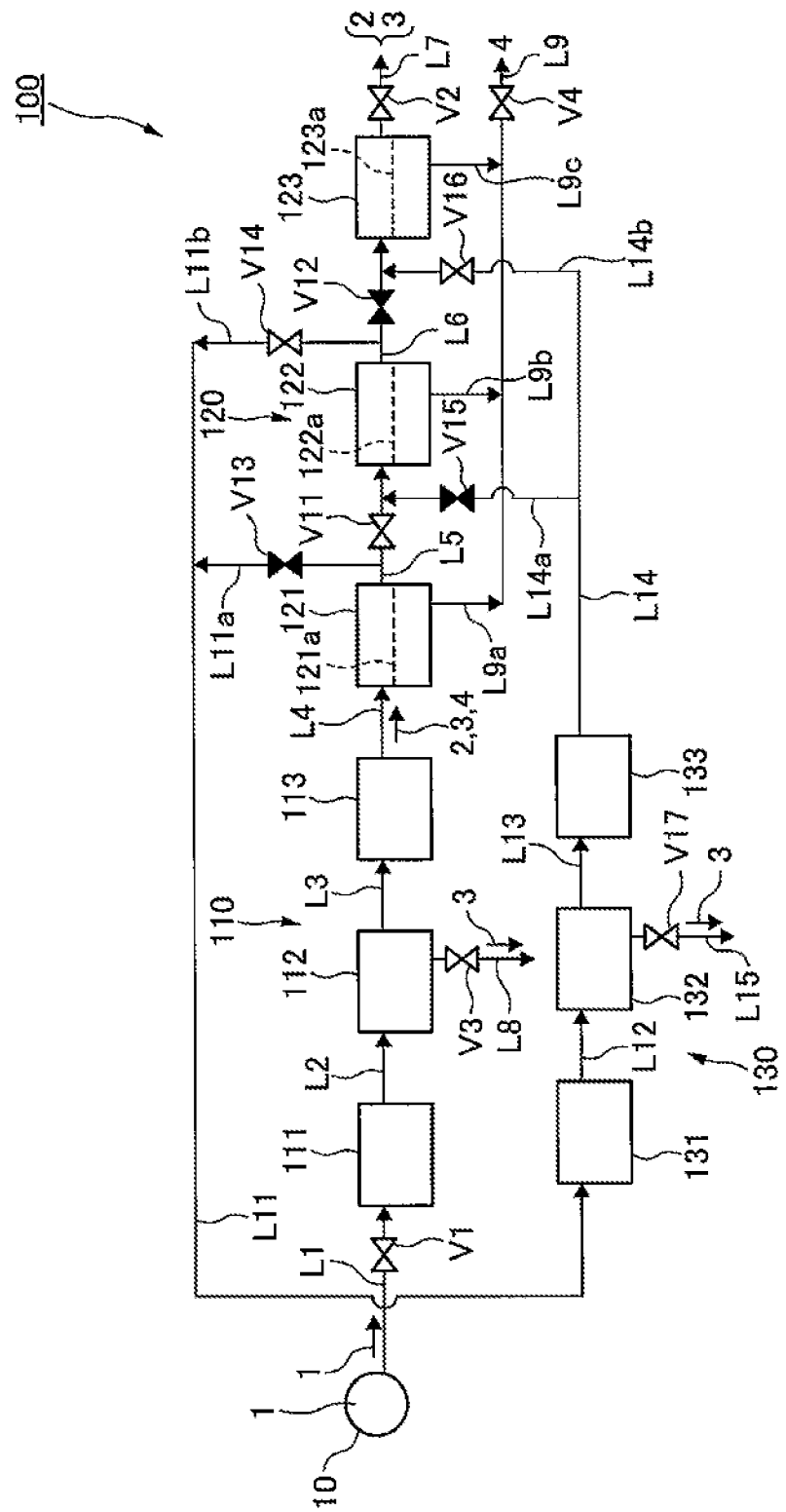
FIG. 3 illustrates a diagram for explaining gas flow in the natural-gas purification apparatus in purification of a natural gas with the concentration of carbon-dioxide gas in the natural gas being higher than the first predetermined value but lower than a second predetermined value.

To solve this, in this embodiment, the on-off valves V13, V12, and V15 are adjusted and controlled to close and the on-off valve V1, V3, V11, V14, V17, V16, V4, and V2 are adjusted and controlled to open, as illustrated in FIG. 3.

Thus, the natural gas 1 supplied from the natural-gas source 10 is pressurized (to 0.5 to 2 MPa) by the first compressor 111 and cooled (to 0 to 20 C) by the first cooling unit 112, so that a part of the natural-gas liquid 3 which is a high-boiling-point hydrocarbon component is liquefied and discharged to the outside of the system through the liquid discharge pipe L8 and the on-off valve V3. On the other hand, the remaining gas (the dry gas 2, the remaining part of the natural-gas liquid 3, and the carbon dioxide 4) is heated (to 50 to 80° C.) by the first heating unit 113 and then supplied to the first carbon-dioxide separation unit 121.

When the natural gas 1 is supplied to the first carbon-dioxide separation unit 121, the carbon dioxide 4 in the natural gas 1 is moved through the carbon-dioxide separation membrane 121a to the lower pressure side (the carbon-dioxide flow side) and discharged to the outside of the system through the first branched portion L9a of the carbon-dioxide discharge pipe L9 and the on-off valve V4. On the other hand, the remaining gas (the dry gas 2, the remaining part of the natural-gas liquid 3, and the remaining part of the carbon dioxide 4) is supplied to the second carbon-dioxide separation unit 122 through the gas supply pipe L5 and the on-off valve V11 without being liquefied.

When the natural gas 1 is supplied to the second carbon-dioxide separation unit 122, the carbon dioxide 4 in the natural gas 1 is moved through the carbon-dioxide separation membrane 122a to the lower pressure side (the carbon-dioxide flow side) and discharged to the outside of the system through the second branched portion L9b of the carbon-dioxide discharge pipe L9 and the on-off valve V4. On the other hand, the remaining gas (the dry gas 2, the remaining part of the natural-gas liquid 3, and the remaining part of the carbon dioxide 4) is supplied to the second compressor 131 through the gas supply pipe L6, the second branched portion L11b of the gas supply pipe L11, and the on-off valve V14 without being liquefied. This remaining gas is pressurized (to 0.5 to 2 MPa) by the second compressor 131 and cooled (to 0 to 20 C) by the second cooling unit 132, so that a part of the natural-gas liquid 3 is also liquefied and discharged to the outside of the system through the liquid discharge pipe L15 and the on-off valve V17. On the other hand, the remaining gas (the dry gas 2, the remaining part of the natural-gas liquid 3, and the remaining part of the carbon dioxide 4) is heated (to 50 to 80° C.) by the second heating unit 133 and then supplied to the third carbon-dioxide separation unit 123.

When the natural gas 1 is supplied to the third carbon-dioxide separation unit 123, the carbon dioxide 4 in the natural gas 1 is moved through the carbon-dioxide separation membrane 123a to the lower pressure side (the carbon-dioxide flow side) and discharged to the outside of the system through the third branched portion L9c of the carbon-dioxide discharge pipe L9 and the on-off valve V4. On the other hand, the remaining gas (the dry gas 2 and the remaining part of the natural-gas liquid 3) is collected through the gas supply pipe L7 and the on-off valve V2 without being liquefied.

In sum, the natural gas 1 is purified by being supplied to the first compressor 111, the first cooling unit 112, the first heating unit 113, and the first and second carbon-dioxide separation units 121 and 122, and then supplied to the third carbon-dioxide separation unit 123 through the second compressor 131, the second cooling unit 132, and the second heating unit 133. After the carbon dioxide 4 in the natural gas 1 is continually separated and removed by the carbon-dioxide separation membranes 121a and 122a of the first and second carbon-dioxide separation units 121 and 122, the natural gas 1 is cooled by the second cooling unit 132 while pressurized by the second compressor 131, so that the natural-gas liquid 3, which is a high-boiling-point hydrocarbon component in the natural gas 1, is separated and removed as much as possible, and then heated by the second heating unit 133 as much as possible. Thereafter, the natural gas 1 is supplied to the third carbon-dioxide separation unit 123. In this way, although the carbon dioxide 4 in the natural gas 1 is separated and removed by the carbon-dioxide separation membrane 123a of the third carbon-dioxide separation unit 123 and thus cools the carbon-dioxide separation membrane 123a and lowers its temperature, the carbon-dioxide separation membrane 123a of the third carbon-dioxide separation unit 123 is maintained at higher temperature than the dew point of the natural gas (high-boiling-point hydrocarbon component).

As described above, by simply switching the gas-flow path by adjusting and controlling the opening degrees of the on-off valves V11 to V17 according to the concentration of the carbon dioxide 4 in the natural gas 1, the high-boiling-point hydrocarbon component can be removed as much as possible from the natural gas 1. Thus, the temperatures of the carbon-dioxide separation membranes 121a to 123a of the carbon-dioxide separation units 121 to 123 can be above the dew point of the high-boiling-point hydrocarbon component, thereby preventing liquefaction of the high-boiling-point hydrocarbon component, even when the carbon dioxide 4 in this gas abruptly expands and drops in temperature by passing through the carbon-dioxide separation membranes 121a to 123a. Hence, the natural gas 1 can be efficiently purified.

Now, assume that the on-off valves V13 to V17 are adjusted and controlled to close and the on-off valves V1, V3, V11, V12, V4, and V2 are adjusted and controlled to open, as illustrated in FIG. 2, when the concentration of the carbon-dioxide gas in the natural gas 1 is higher than or equal to the second predetermined value (e.g. 50%). In this case, the natural gas 1 is supplied to the first compressor 111, the first cooling unit 112, and the first heating unit 113 and then supplied to the first to third carbon-dioxide separation units 121 to 123 without being supplied to the second compressor 131, the second cooling unit 132, or the second heating unit 133. Thus, the carbon dioxide 4 in the natural gas 1 is separated and removed by the carbon-dioxide separation membranes 121a to 123a of the first to third carbon-dioxide separation units 121 to 123. In this operation, however, the carbon-dioxide separation membranes 121a to 123a are cooled and their temperatures possibly drop to such an extent that the high-boiling-point hydrocarbon component is liquefied on the higher pressure side of the carbon-dioxide separation membranes 122a and 123a of the second and third carbon-dioxide separation units 122 and 123 and covers the carbon-dioxide separation membranes 122a and 123a, thereby causing functional deterioration of the carbon-dioxide separation membranes 122a and 123a.

Assume also that the on-off valves V13, V12, and V15 are adjusted and controlled to close and the on-off valves V1, V3, V11, V14, V17, V16, V4, and V2 are adjusted and controlled to open, as illustrated in FIG. 3. In this case, the natural gas 1 is supplied to the first compressor 111, the first cooling unit 112, the first heating unit 113, and the first and second carbon-dioxide separation units 121 and 122, and then supplied to the third carbon-dioxide separation unit 123 through the second compressor 131, the second cooling unit 132, and the second heating unit 133. Thus, the carbon dioxide 4 in the natural gas 1 is separated and removed by the carbon-dioxide separation membranes 121a and 122a of the first and second carbon-dioxide separation units 121 and 122. In this operation, however, the carbon-dioxide separation membrane 122a of the second and third carbon-dioxide separation unit 122 is cooled and its temperature possibly drops to such an extent that the high-boiling-point hydrocarbon component is liquefied on the higher pressure side of the carbon-dioxide separation membrane 122a and covers the carbon-dioxide separation membrane 122a, thereby causing functional deterioration of the carbon-dioxide separation membrane 122a.

Figure 4:
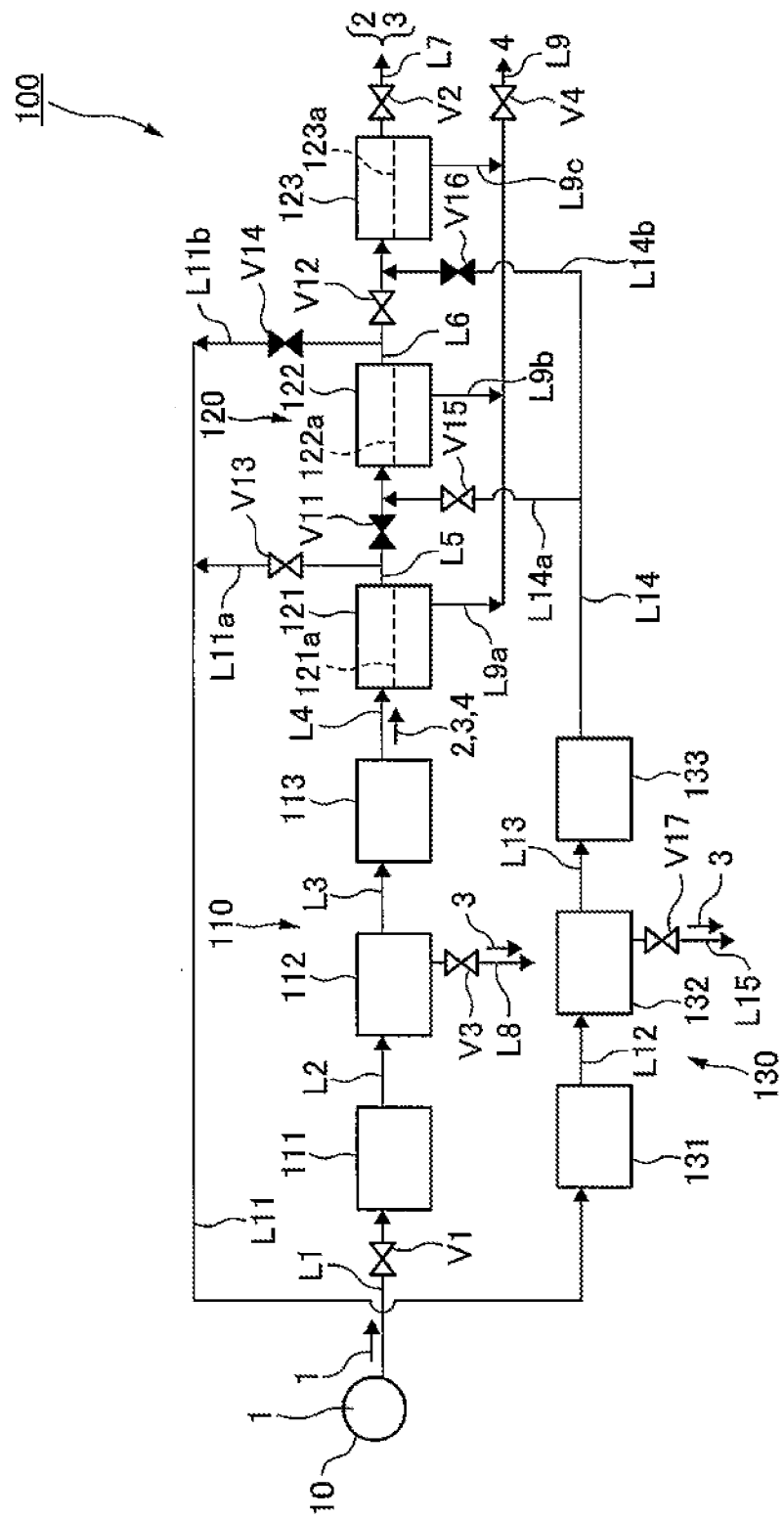
FIG. 4 illustrates a diagram for explaining gas flow in the natural-gas purification apparatus in purification of a natural gas with the concentration of carbon-dioxide gas in the natural gas being higher than or equal to the second predetermined value.

To solve this, in this embodiment, the on-off valves V11, V14, and V16 are adjusted and controlled to close and the on-off valve V1, V3, V13, V17, V15, V12, V4, and V2 are adjusted and controlled to open, as illustrated in FIG. 4.

Thus, the natural gas 1 supplied from the natural-gas source 10 is pressurized (to 0.5 to 2 MPa) by the first compressor 111 and cooled (to 0 to 20 C) by the first cooling unit 112, so that a part of the natural-gas liquid 3 which is a high-boiling-point hydrocarbon component is liquefied and discharged to the outside of the system through the liquid discharge pipe L8 and the on-off valve V3. On the other hand, the remaining gas (the dry gas 2, the remaining part of the natural-gas liquid 3, and the carbon dioxide 4) is heated (to 50 to 80° C.) by the first heating unit 113 and then supplied to the first carbon-dioxide separation unit 121.

When the natural gas 1 is supplied to the first carbon-dioxide separation unit 121, the carbon dioxide 4 in the natural gas 1 is moved through the carbon-dioxide separation membrane 121a to the lower pressure side (the carbon-dioxide flow side) and discharged to the outside of the system through the first branched portion L9a of the carbon-dioxide discharge pipe L9 and the on-off valve V4. On the other hand, the remaining gas (the dry gas 2, the remaining part of the natural-gas liquid 3, and the remaining part of the carbon dioxide 4) is supplied to the second compressor 131 through the gas supply pipe L5, the first branched portion L11a of the gas supply pipe L11, and the on-off valve V13 without being liquefied. This remaining gas is pressurized (to 0.5 to 2 MPa) by the second compressor 131 and cooled (to 0 to 20 C) by the second cooling unit 132, so that the part of a natural-gas liquid 3 is also liquefied and discharged to the outside of the system through the liquid discharge pipe L15 and the on-off valve V17. On the other hand, the remaining gas (the dry gas 2, the remaining part of the natural-gas liquid 3, and the remaining part of the carbon dioxide 4) is heated (to 50 to 80° C.) by the second heating unit 133 and then supplied to the second carbon-dioxide separation unit 122.

When the natural gas 1 is supplied to the second carbon-dioxide separation unit 122, the carbon dioxide 4 in the natural gas 1 is moved through the carbon-dioxide separation membrane 122a to the lower pressure side (the carbon-dioxide flow side) and discharged to the outside of the system through the second branched portion L9b of the carbon-dioxide discharge pipe L9 and the on-off valve V4. On the other hand, the remaining gas (the dry gas 2, the remaining part of the natural-gas liquid 3, and the remaining part of the carbon dioxide 4) is supplied to the third carbon-dioxide separation unit 123 through the gas supply pipe L6 and the on-off valve V12 without being liquefied.

When the natural gas 1 is supplied to the third carbon-dioxide separation unit 123, the carbon dioxide 4 in the natural gas 1 is moved through the carbon-dioxide separation membrane 123a to the lower pressure side (the carbon-dioxide flow side) and discharged to the outside of the system through the third branched portion L9c of the carbon-dioxide discharge pipe L9 and the on-off valve V4. On the other hand, the remaining gas (the dry gas 2 and the remaining part of the natural-gas liquid 3) is collected through the gas supply pipe L7 and the on-off valve V2 without being liquefied.

In sum, the natural gas 1 is purified by being supplied to the first compressor 111, the first cooling unit 112, the first heating unit 113, and the first carbon-dioxide separation unit 121, and then supplied to the second and third carbon-dioxide separation units 122 and 123 through the second compressor 131, the second cooling unit 132, and the second heating unit 133. After the carbon dioxide 4 in the natural gas 1 is separated and removed by the carbon-dioxide separation membrane 121a of the first carbon-dioxide separation unit 121, the natural gas 1 is cooled by the second cooling unit 132 while pressurized by the second compressor 131, so that the natural-gas liquid 3, which is a high-boiling-point hydrocarbon component in the natural gas 1, is separated and removed as much as possible, and then heated by the second heating unit 133 as much as possible. Thereafter, the natural gas 1 is supplied to the second and third carbon-dioxide separation units 122 and 123. In this way, although the carbon dioxide 4 in the natural gas 1 is separated and removed by the carbon-dioxide separation membranes 122a and 123a of the second and third carbon-dioxide separation units 122 and 123 and thus cools the carbon-dioxide separation membrane 122a and 123a and lowers their temperatures, the carbon-dioxide separation membranes 122a and 123a of the second and third carbon-dioxide separation units 122 and 123 are maintained at higher temperature than the dew point of the natural gas (high-boiling-point hydrocarbon component).

As described above, by simply switching the gas-flow path by adjusting and controlling the opening degrees of the on-off valves V11 to V17 according to the concentration, of the carbon dioxide 4 in the natural, gas 1, the high-boiling-point hydrocarbon component can be removed as much as possible from the natural gas 1. Thus, the temperatures of the carbon-dioxide separation membranes 121a to 123a of the carbon-dioxide separation units 121 to 123 can be above the dew point of the high-boiling-point hydrocarbon component, thereby preventing liquefaction of the high-boiling-point hydrocarbon component, even when the carbon dioxide 4 in this gas abruptly expands and drops in temperature by passing through the carbon-dioxide separation membranes 121a to 123a. Hence, the natural gas 1 can be efficiently purified.

Thus, in this embodiment, the natural-gas purification apparatus 100 includes: the first compressor 111; the first cooling unit 112; the first heating unit 113; and the first to third carbon-dioxide separation units 121 to 123, which include the carbon-dioxide separation membranes 121a to 123a and are arranged in series. The natural-gas purification apparatus 100 further includes: the gas supply pipes L11 to L14, which are provided between the first to third carbon-dioxide separation units 121 to 123 through the on-off valves V11 to V16 and which supply the natural gas 1; the second compressor 131, which is provided on the gas supply pipes L11 to L14 and adjusts the pressure of the natural gas 1 after the separation of the carbon dioxide 4 by the first or second carbon-dioxide separation unit 121 or 122; the second cooling unit 132, which liquefies and separates the high-boiling-point hydrocarbon component by cooling the natural gas 1 after the pressure adjustment by the second compressor 131; and the second heating unit 133, which heats the natural gas 1 after the separation of the high-boiling-point hydrocarbon component by the second cooling unit 132. By adjusting and controlling the opening degrees of the on-off valves V11 to V16, the natural gas 1 after the carbon-dioxide separation and removal by the first carbon-dioxide separation unit 121 can be supplied to the second and third carbon-dioxide separation units 122 and 123, or supplied to the second carbon-dioxide separation unit 122 and then supplied to the third carbon-dioxide separation unit 123 through the second compressor 131, the second cooling unit 132, and the second heating unit 133, or supplied to the second and third carbon-dioxide separation units 122 and 123 through the second compressor 131, the second cooling unit 132, and the second heating unit 133. Thus, in the purification of the natural gas 1, the high-boiling-point hydrocarbon component can be removed as much as possible from the natural gas 1 before the dew point of the natural gas containing the high-boiling-point hydrocarbon component is reached, by simply switching the supply path of the natural gas 1 according to the concentration of the carbon dioxide 4 in the natural gas 1 from the ground to cause the natural gas 1 to flow through the second compressor 131, the second cooling unit 132, and the second heating unit 133 so that liquefaction of the high-boiling-point hydrocarbon component in the carbon-dioxide separation units 122 and 123 will be suppressed. Consequently, the temperatures of the carbon-dioxide separation membranes 121a to 123a of the carbon-dioxide separation units 121 to 123 can be above the dew point of the high-boiling-point hydrocarbon component, thereby preventing liquefaction of the high-boiling-point hydrocarbon component, even when the carbon dioxide 4 in the natural gas 1 abruptly expands and drops in temperature by passing through the carbon-dioxide separation membranes 121a to 123a. Hence, the natural gas 1 can be efficiently purified. In the case of purifying a natural gas containing a high concentration of carbon dioxide, the natural-gas purification apparatus 100 does not require modifications such as adding a device for preventing liquefaction of the high-boiling-point hydrocarbon component, but simply switches the gas flow according to the composition of the natural gas 1. Hence, versatility is improved.

When the concentration of the carbon-dioxide gas in the natural gas 1 supplied from the natural-gas source 10 is in the range greater than the first predetermined value but less than the second predetermined value (e.g. greater than 20% but less than 50%), the natural gas 1 is supplied to the first compressor 111, the first cooling unit 112, the first heating unit 113, and the first and second carbon-dioxide separation units 121 and 122, and then supplied to the third carbon-dioxide separation unit 123 through the second compressor 131, the second cooling unit 132, and the second heating unit 133. In this way, although the carbon-dioxide gas in the natural gas 1 is separated and removed by the carbon-dioxide separation membrane 123a and lowers the temperature of the carbon-dioxide separation membrane 123a, the temperature of the carbon-dioxide separation membrane 123a does not fall below the dew point of the high-boiling-point hydrocarbon component. This suppresses decrease in efficiency of purification of the natural gas 1 due to liquefaction of the high-boiling-point hydrocarbon component.

When the concentration of the carbon-dioxide gas in the natural gas 1 supplied from the natural-gas source 10 is in higher than or equal to the second predetermined value (e.g. 50%), the natural gas 1 is supplied to the first compressor 111, the first cooling unit 112, the first heating unit 113, and the first carbon-dioxide separation unit 121 and then supplied to the second and third carbon-dioxide separation units 122 and 123 through the second compressor 131, the second cooling unit 132, and the second heating unit 133. In this way, although the carbon-dioxide gas in the natural gas 1 is separated and removed by the carbon-dioxide separation membranes 122a and 123a and lowers the temperatures of the carbon-dioxide separation membranes 122a and 123a, the temperatures of the carbon-dioxide separation membranes 122a and 123a do not fall below the dew point of the high-boiling-point hydrocarbon component. This suppresses decrease in efficiency of purification of the natural gas 1 due to liquefaction of the high-boiling-point hydrocarbon component.

The above-described natural-gas purification apparatus 100 is installed on the transport vehicle (trailer) 150 and is therefore mobile. Thus, after being used to purify a natural gas 1 from a given natural-gas source 10, the natural-gas purification apparatus 100 can be moved to another natural-gas source that discharges a natural gas differing in composition from the natural gas 1, and this natural gas can be efficiently purified by simply adjusting and controlling the opening degrees of the on-off valves V11 to V16 according to the composition of the natural gas (the content of carbon dioxide). Hence, versatility is improved.

Other Embodiments

Note that the above description has been given using the natural-gas purification apparatus 100, which includes the three carbon-dioxide separation units 121 to 123. However, it is also possible to configure a natural-gas purification apparatus including four or more carbon-dioxide separation units.

The above description has been given using the natural-gas purification apparatus 100, which includes the on-off valves V11 to V16, provided on the gas supply pipes L5 and L6 and the first and second branched portions L11a, L11b, L14a, and L14b of the gas supply pipes L11 and L14, respectively. However, it is also possible to configure a natural-gas purification apparatus including three-way valves provided at the joints of the gas supply pipe L5 and the first branched portions L11a and L14a of the gas supply pipes L11 and L14 and at the joints of the gas supply pipe L6 and the second branched portions L11b and L14b of the gas supply pipes L11 and L14.

The above description has been given using the natural-gas purification apparatus 100, which is installed on the transport vehicle (trailer) 150. However, it is also possible to configure a natural-gas purification apparatus installed on a ship instead of a transport vehicle (trailer). In this case, it is not necessary to readjust the entire design according to the composition of natural gas from a natural-gas source on the ocean. Hence, the natural-gas purification cost can be reduced accordingly.

The above description has been given using the natural-gas purification apparatus 100, which adjusts and controls the opening degrees of the on-off valves V11 to V16 such that the natural gas 1 will be supplied to the first, second, and third carbon-dioxide separation units 121, 122, and 123 without being supplied to the bypass path when the concentration of the carbon-dioxide gas in the natural gas 1 is low (e.g. 20% or lower); adjusts and controls the opening degrees of the on-off valves V11 to V16 such that the natural gas 1 will be supplied to the first and second carbon-dioxide separation units 121 and 122 and then supplied to the third carbon-dioxide separation unit 123 through the bypass path when the concentration of the carbon-dioxide gas in the natural gas 1 is moderate (e.g. higher than 20% but lower than 50%); and adjusts and controls the opening degrees of the on-off valves V11 to V16 such that the natural gas 1 will be supplied to the first carbon-dioxide separation unit 121 and then supplied to the second and third carbon-dioxide separation units 122 and 123 through the bypass path when the concentration of the carbon-dioxide gas in the natural gas 1 is high (e.g. higher than or equal to 50%). However, it is also possible to configure a natural-gas purification apparatus which adjusts and controls the opening degrees of the on-off valves V11 to V16 such that the natural gas 1 will be supplied to the first carbon-dioxide separation unit 121 and then supplied to the second and third carbon-dioxide separation units 122 and 123 through the bypass path when the concentration of the carbon-dioxide gas in the natural gas 1 is high (e.g. higher than 20%).

REFERENCE SIGNS LIST

1 NATURAL GAS
2 DRY GAS
3 NATURAL-GAS LIQUID
4 CARBON DIOXIDE
10 NATURAL-GAS SOURCE
100 NATURAL-GAS PURIFICATION APPARATUS
110 FIRST CARBON-DIOXIDE-SEPARATION ACCELERATION DEVICE
111 FIRST COMPRESSOR
112 FIRST COOLING UNIT
113 FIRST HEATING UNIT
120 CARBON-DIOXIDE SEPARATION DEVICE
121 FIRST CARBON-DIOXIDE SEPARATION UNIT
121a CARBON-DIOXIDE SEPARATION MEMBRANE
122 SECOND CARBON-DIOXIDE SEPARATION UNIT
122a CARBON-DIOXIDE SEPARATION MEMBRANE
123 THIRD CARBON-DIOXIDE SEPARATION UNIT
123a CARBON-DIOXIDE SEPARATION MEMBRANE
130 SECOND CARBON-DIOXIDE-SEPARATION ACCELERATION DEVICE
131 SECOND COMPRESSOR
132 SECOND COOLING UNIT

133 SECOND HEATING UNIT
150 TRANSPORT VEHICLE (TRAILER)
L1 TO L7, L11 TO L14 GAS SUPPLY PIPE
L8, L15 LIQUID DISCHARGE PIPE
L9 CARBON-DIOXIDE DISCHARGE PIPE
V1 TO V4, V11 TO V17 ON-OFF VALVE

The invention claimed is:

1. A natural-gas purification apparatus for purifying natural gas from ground by separating carbon dioxide from the natural gas, comprising:
   a first pressure adjuster that adjusts a pressure of the natural gas from the ground;
   a first high-boiling-point-hydrocarbon-component separator that liquefies and separates a high-boiling-point hydrocarbon component by cooling the natural gas after the pressure adjustment by the first pressure adjuster;
   a first heater that heats the natural gas after the separation of the high-boiling-point hydrocarbon component by the first high-boiling-point-hydrocarbon-component separator;
   a carbon-dioxide separator including a plurality of carbon-dioxide separation units that are arranged in series and separate carbon dioxide from the natural gas heated by the first heater through carbon-dioxide separation membranes;
   a bypass path that is provided in each of gas supply pipes connecting the plurality of carbon-dioxide separation units of the carbon-dioxide separator to each other in series, through a gas-flow switcher and supplies the natural gas after the carbon-dioxide separation by the carbon-dioxide separator;
   a second pressure adjuster that is provided on the bypass path and adjusts the pressure of the natural gas after the carbon-dioxide separation by the carbon-dioxide separators;
   a second high-boiling-point-hydrocarbon-component separator that liquefies and separates a high-boiling-point hydrocarbon component by cooling the natural gas after the pressure adjustment by the second pressure adjuster; and
a second heater that heats the natural gas after the separation of the high-boiling-point hydrocarbon component by the second high-boiling-point-hydrocarbon-component separator,
   wherein the by-pass path includes:
   a first gas supply path that supplies the natural gas after the carbon dioxide separation by the carbon-dioxide separation unit that is arranged upstream of the gas-flow switcher in gas flow to the second pressure adjuster; and
   a second gas supply path that supplies the natural gas heated by the second heater to the carbon dioxide separation unit that is arranged downstream of the gas-flow switcher in the gas flow.

2. The natural-gas purification apparatus according to claim 1, wherein
   the plurality of carbon-dioxide separation units of the carbon-dioxide separator include:
   a first carbon-dioxide separation unit; and
   a second carbon-dioxide separation unit to which the natural gas after the carbon-dioxide separation by the first carbon-dioxide separation unit is supplied, and
   the first gas supply path of the bypass path supplies the natural gas after the carbon-dioxide separation by the first carbon-dioxide separation unit to the second pressure adjuster, and
   the second gas supply path of the bypass path supplies the natural gas heated by the second heater to the second carbon-dioxide separation unit.

3. The natural-gas purification apparatus according to claim 1, wherein
   the plurality carbon-dioxide separation units of the carbon-dioxide separator include:
   a first carbon-dioxide separation unit;
   a second carbon-dioxide separation unit to which the natural gas after the carbon-dioxide separation by the first carbon-dioxide separation unit is supplied; and
   a third carbon-dioxide separation unit to which the natural gas after the carbon-dioxide separation by the second carbon-dioxide separation unit is supplied, and
   the first gas supply path of the bypass path supplies the natural gas after the carbon-dioxide separation by any one of the first and second carbon-dioxide separation units to the second pressure adjuster, and
   the second gas supply path of the bypass path supplies the natural gas heated by the second heater to any one of the second and third carbon-dioxide separation units.

4. The natural-gas purification apparatus according to claim 1, wherein the natural-gas purification apparatus is mobile.

* * * * *